Patented Apr. 11, 1939

2,154,089

UNITED STATES PATENT OFFICE 2,154,089

PRINTING INK

Endocen H. Hillman, Chicago, Ill., assignor to Standard Oil Company, Chicago, Ill., a corporation of Indiana No Drawing. Application November 5, 1935, Serial No. 48,443

5 Claims. (Cl. 260—23)

This invention pertains to inks and in particular to an improved printing ink containing plastic resins.

It is common practice to incorporate in printing inks various types of gums, resins, varnish and similar materials. However, inks prepared with such materials commonly possess undesirable characteristics such as the tendency to gum and form skin over the surface of the ink, the tendency to dry on the rollers, the tendency to spread unevenly on the rollers and other undesirable properties.

It is the object of this invention to prepare printing inks useful for the printing of fabrics, art papers, wall papers, news print, books, signs, etc. possessing unusual binding properties for the pigment. Another object of the invention is to prepare printing inks containing a binder which is waterproof and which is water-white and clear so that the binder will not interfere with the pigment colors. Still another object of the invention is to prepare printing inks which do not become dull. Another object of the invention is to prepare printing inks which spread evenly on the printing rollers and which have no tendency to dry thereon. Still another object of the invention is to prepare printing inks which have no tendency to spread or flow beyond the surface to which it is applied so that sharper designs, types, etc. are obtained.

I obtain the foregoing objects in printing inks by using as one of the ingredients thereof synthetic plastic resins obtained by the condensation and/or polymerization and/or hydrogenation of hydrocarbons. Such plastic resins may be obtained by the polymerization of isoolefins such as gaseous or liquid olefins containing branched side chains in the molecule; for example, isobutylene, with a catalyst such as boron fluoride, aluminum chloride, boron chloride, zinc chloride and other gaseous or solid volatile halides of the second, fifth, sixth and eighth groups of the periodic systems.

Although any one of the plastic resin-like products of the foregoing paragraph may be used, I prefer to use the plastic resin-like high molecular weight hydrocarbons having a molecular weight ranging from 1,000 to 12,000 and preferably from 1,500 to 8,000, obtained by the condensation at atmospheric pressure of isobutylene with boron fluoride at temperatures as low as −40° to −100° F. The preferred method of obtaining this product is to treat isobutylene at a temperature of −80° F. at atmospheric pressure with about 0.1 to 0.5% by weight of boron fluoride. The isobutylene which is liquid at −80° F. may be held in a vessel surrounded by a refrigerating bath and boron fluoride added thereto with constant stirring until the desired plastic viscous resin is produced. The condensation product may be subsequently freed of boron fluoride by washing, distillation or other suitable means. The purified viscous resin-like condensation product so obtained is a clear water-white product having a molecular weight ranging from 1,500 to 8,000. The empirical formula is approximately $C_nH_{2n}$ and the product is very resistant to the action of chemical agents, oxidation, etc.

For the sake of brevity this plastic resin-like product will be hereinafter referred to as the "isobutylene polymer resin."

I have discovered that when this product is incorporated in printing ink, an ink is obtained which possesses properties superior to those obtained by inks heretofore prepared. The olefin polymer resins change very little in plasticity with changes in temperatures, enhancing the stability of the ink containing the same. These resins being light in color and clear, do not interfere with the pigment colors or cause them to be dull. Because of the high molecular weight of the isobutylene polymer resin, inks containing the same do not spread beyond the location to which it is applied so that the printed design, types, etc. have much sharper outlines than those printed with other inks.

The proportion of isobutylene polymer resin used in the printing ink will obviously vary with the type of ink. In preparing ink for printing on newspaper stock and other soft papers, the pigment may be mixed with the isobutylene polymer resin and the mixture suspended in a heavy mineral oil. To obtain the proper consistency the mixture may be thinned with a diluent such as oleum spirits, mineral seal oil, etc.

For the purpose of illustrating without limiting the invention, the following example will demonstrate the application of my invention in making news print ink: a mixture of about 60–70% isobutylene polymer resin and 40–30% lamp black is thoroughly mixed by suitable means such as by a pigment mixer or colloid mill, and the mixture then thinned to the desired consistency by adding thereto the required amount of oleum spirits. In place of lamp black I may use other pigments such as indigo, Prussian blue, chrome green, ultramarine blue, etc. The isobutylene polymer resin being a clear water-white compound does not interfere with the color pigments so that the ink prepared therefrom possesses the true pigment color.

In preparing inks for use on hard or non-absorbent paper I may add to the above formula a small amount, for example 5–10%, of boiled linseed oil or other drying oils.

Inks suitable for printing upon textiles may be prepared by mixing the olefin polymer resin with aniline dyes such as Sudan reds, sulfur blacks, spirit colors, etc.

The olefin polymer resin, being neutral, has been found very suitable for the preparation of printing inks having as a constituent corrodible metallic pigment such as bronz, gold and silver pigments.

The foregoing examples of the application of olefin polymer resins and the preparation of inks are merely illustrative and do not exclude the addition of other constituents such as waxes, etc., often used in the preparation of special types of inks.

Although the present invention has been described in connection with details or specific examples thereof it is not intended that these shall be regarded as limitations upon the scope of the invention except insofar as included in the accompanying claims.

I claim:

1. A printing ink which spreads evenly and has substantially no tendency to dry on printing press rolls comprising a printing ink coloring material and an isobutylene polymer having a molecular weight of from about 1,000 to about 12,000 as a binder.

2. A printing ink which spreads evenly and has substantially no tendency to dry on printing press rolls comprising a pigment, a drying oil and as a binder an isobutylene polymer having a molecular weight of from about 1,000 to about 12,000.

3. A printing ink as described in claim 2 in which the drying oil is boiled linseed oil.

4. A printing ink which spreads evenly and has substantially no tendency to dry on printing press rolls comprising an aniline dye and a high molecular weight isobutylene polymer having a molecular weight of from about 1,000 to about 12,000.

5. A printing ink which spreads evenly and has substantially no tendency to dry on printing press rolls comprising from about 30% to about 40% lamp black, from about 60% to about 70% of an isobutylene polymer having a molecular weight of from about 1,000 to about 12,000 as a binder, and a thinner.

ENDOCEN H. HILLMAN.